United States Patent
Casado-Montero et al.

(10) Patent No.: US 11,091,271 B2
(45) Date of Patent: Aug. 17, 2021

(54) AUXILIARY AIR SUPPLY FOR AN AIRCRAFT

(71) Applicant: Airbus Operations S.L., Getafe (ES)

(72) Inventors: Carlos Casado-Montero, Getafe (ES); Victor Barreiro Rodriguez, Getafe (ES); Alexandra Carrasco Carrascal, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 131 days.

(21) Appl. No.: 16/336,956

(22) PCT Filed: Sep. 29, 2016

(86) PCT No.: PCT/ES2016/070684
§ 371 (c)(1),
(2) Date: Mar. 27, 2019

(87) PCT Pub. No.: WO2018/060531
PCT Pub. Date: Apr. 5, 2018

(65) Prior Publication Data
US 2019/0263528 A1 Aug. 29, 2019

(51) Int. Cl.
*B64D 13/08* (2006.01)
*B64D 13/06* (2006.01)
(Continued)

(52) U.S. Cl.
CPC ............ *B64D 13/08* (2013.01); *B64D 13/06* (2013.01); *B64D 27/10* (2013.01); *B64D 41/00* (2013.01);
(Continued)

(58) Field of Classification Search
CPC .................. B64D 13/06; B64D 13/08; B64D 2013/0611; B64D 2013/0618; B64D 27/10; B64D 41/00; Y02T 50/50; Y02T 50/56
See application file for complete search history.

(56) References Cited

U.S. PATENT DOCUMENTS 8,936,071 B2 * 1/2015 Bruno .................... B64D 13/06
165/104.19
9,580,179 B2 * 2/2017 Houssaye .............. B64D 13/08
(Continued)

FOREIGN PATENT DOCUMENTS

DE 3509767 A1 1/1986
EP 2272756 A1 1/2011
(Continued)

OTHER PUBLICATIONS

International Search Report; priority document.

*Primary Examiner* — Filip Zec
(74) *Attorney, Agent, or Firm* — Greer, Burns & Crain, Ltd.

(57) ABSTRACT

A secondary power unit for an aircraft comprises a gas turbine engine having at least one drive shaft, a twin-load compressor including first and second load compressors both coupled with the drive shaft, a first ram-air intake in fluid communication with the twin-load compressor, and a flow regulating arrangement coupled with the first and second compressors outputs to individually regulate the generated flow of compressed air. The flow regulating arrangement is also adapted to be fluidly communicated with an Air Cycle Machine of an aircraft, and a control system is adapted to feed the flow of compressed air as bleed air to the Air Cycle Machine of an aircraft, both when the aircraft is on ground and in flight. The secondary power unit is capable of avoiding bleed air extraction from the main engines with the aim of reducing fuel consumption.

15 Claims, 4 Drawing Sheets

(51) Int. Cl.
*B64D 27/10* (2006.01)
*B64D 41/00* (2006.01)

(52) U.S. Cl.
CPC .............. *B64D 2013/0611* (2013.01); *B64D 2013/0618* (2013.01); *Y02T 50/50* (2013.01)

(56) References Cited

U.S. PATENT DOCUMENTS

| | | |
|---|---|---|
| 9,617,005 B1 * | 4/2017 | Schiff .................... B64D 13/06 |
| 9,789,967 B2 * | 10/2017 | Shea ...................... B64D 13/08 |
| 2008/0032616 A1 | 2/2008 | Vogel |
| 2008/0245062 A1 | 10/2008 | Dionne |
| 2009/0275276 A1 | 11/2009 | Casado Montero et al. |
| 2013/0039781 A1 | 2/2013 | Pascu et al. |
| 2013/0151039 A1 * | 6/2013 | Haillot ................. F01D 17/165 |
| | | 701/3 |
| 2014/0305130 A1 | 10/2014 | Shepard et al. |
| 2015/0096359 A1 | 4/2015 | Catt |
| 2016/0039371 A1 * | 2/2016 | Blumer .................. F02C 7/268 |
| | | 290/31 |
| 2018/0346132 A1 * | 12/2018 | Casado-Montero ... B64D 13/06 |

FOREIGN PATENT DOCUMENTS

| | | |
|---|---|---|
| EP | 2789537 A1 | 10/2014 |
| WO | 03037715 A1 | 5/2003 |

* cited by examiner

AUXILIARY AIR SUPPLY FOR AN AIRCRAFT

CROSS-REFERENCES TO RELATED APPLICATIONS

This application claims the benefit of the International Application No. PCT/ES2016/070684, filed on Sep. 29, 2016, the entire disclosures of which are incorporated herein by way of reference.

FIELD OF THE INVENTION

The present invention refers in general to aircraft air-conditioning systems based on bleed air, and to aircrafts incorporating such air-conditioning systems.

The invention also refers to auxiliary equipment to provide electric, pneumatic, electric and/or hydraulic external power to an aircraft.

BACKGROUND OF THE INVENTION

Commercial aircraft commonly integrate air conditioning systems for supplying conditioned air with a desired temperature and pressure to a pressurized cabin. The air conditioning system, in addition to regulating temperature and pressure of air cabin, also serve to dehumidify the cabin and supply oxygen.

Typically, aircraft air conditioning systems are supplied with bleed air in the form of hot compressed air that is taken from a compressor stage of a main engine of the aircraft, or alternatively the hot compressed air is provided by a compressor driven by a gas turbine of an Auxiliary Power Unit (APU) when the aircraft is on the ground and the main engines are stopped. The bleed extraction from the main engines typically implies a small percentage of block fuel in normal cycle.

An APU comprises a gas turbine, a pneumatic compressor, and/or a hydraulic pump, a gearbox and one or several electric generators, in order to provide electric, and/or pneumatic and/or hydraulic power. The main use of an APU is when the aircraft is on ground and the main engines are stopped, thus they cannot provide to the aircraft with necessary electric, pneumatic or hydraulic external power. During flight, the APU normally is not used, and the hydraulic and electric supply, as well as the bleed air, are provided by the main engines.

On the other hand, an Air Cycle Machine ACM is the main equipment of an air conditioning system, and it is generally formed by a turbine driven by bleed air taken from a main engine, such as the turbine power is transmitted to a compressor connected to a common shaft. The engine bleed air to be supplied to the turbine, is compressed by the compressor and then supplied to a pressurized cabin.

Such conventional air-conditioning systems operate at high pressure and temperature levels, for example, the withdrawn bleed air is typically at 200° C.

These air-conditioning systems usually require "ram air" as a heat sink, so that the bleed air used for the air-conditioning is cooled by means of this ram air, as well as compression, intermediate cooling and expansion of the bleed air. However, ram doors when deployed, normally implies an increase of drag that can vary depending on the need of cooling air that can vary from 0.2 to 1% of block fuel or even more.

There is the need for more efficient aircraft air conditioning systems which reduce block fuel consumption.

SUMMARY OF THE INVENTION

An object of the invention is to provide a Secondary Power Unit for an aircraft which is capable of avoiding bleed air extraction from the main engines, or at least efficiently reducing bleed air extracted/supplied from the main engines, and consequently reducing fuel consumption.

Another object of the invention is to provide an air-conditioning system which reduces up to 50% the energy needed for conditioning an aircraft cabin, or even more, depending of the flight phase.

The present invention provides an enhanced auxiliary power unit for an aircraft, which is used to supply bleed air to an aircraft bleed system during all operations stages of an aircraft, namely: parked, taxing, climbing, cruising, descending and landing, so that the amount of bleed air extracted from the main engines is reduced or avoided, and in turn fuel consumption is also reduced.

Therefore, an aspect of the invention refers to a secondary power unit for an aircraft adapted for supplying bleed air for an aircraft cabin, wherein the secondary power unit comprises a gas-turbine engine having a drive shaft and a twin-load compressor including first and second load compressors both mechanically coupled with the drive shaft.

The secondary power unit additionally comprises a first ram-air intake in fluid communication with the twin-load compressor to feed ram air to the first and second load compressors, and bleed flow regulating means coupled with the first and second compressors outputs to individually regulate their operation and their compressed air output.

The flow regulating means are in fluid communication with an exhaust output to evacuate surge air to the exterior, and are adapted to be fluidly communicated with an Air Cycle Machine (ACM) of an aircraft.

The secondary power unit additionally comprises a control system adapted to control the operation of the first and second compressor and the flow regulating means, such as the control system is adapted to provide bleed air both when an aircraft is on ground and during flight.

Unlike prior art APU's that only operate when the aircraft is on the ground or in emergency situations when in flight able to deliver partial power supply, either pneumatic or electrical or both, the secondary power unit of the invention is adapted to operate in all stages of an aircraft operation able to satisfy the complete aircraft demand, either electrical or pneumatic or hydraulic, at least for a normal operation, so that the amount of bleed air extracted from the main engines is significantly reduced or even avoided, achieving thereby a significant block fuel saving.

Preferably, the flow regulating means comprises a first three-way valve coupled with the first compressor output, and a second three-way valve coupled with the second compressor output. First and second three-way valves are in fluid communication with the exhaust output, and are adapted to be communicated with an Air Cycle Machine (ACM) of an aircraft.

BRIEF DESCRIPTION OF THE DRAWINGS

Preferred embodiments of the invention are henceforth described with reference to the accompanying drawings, wherein.

DETAILED DESCRIPTION OF THE PREFERRED EMBODIMENTS

Figure 1:
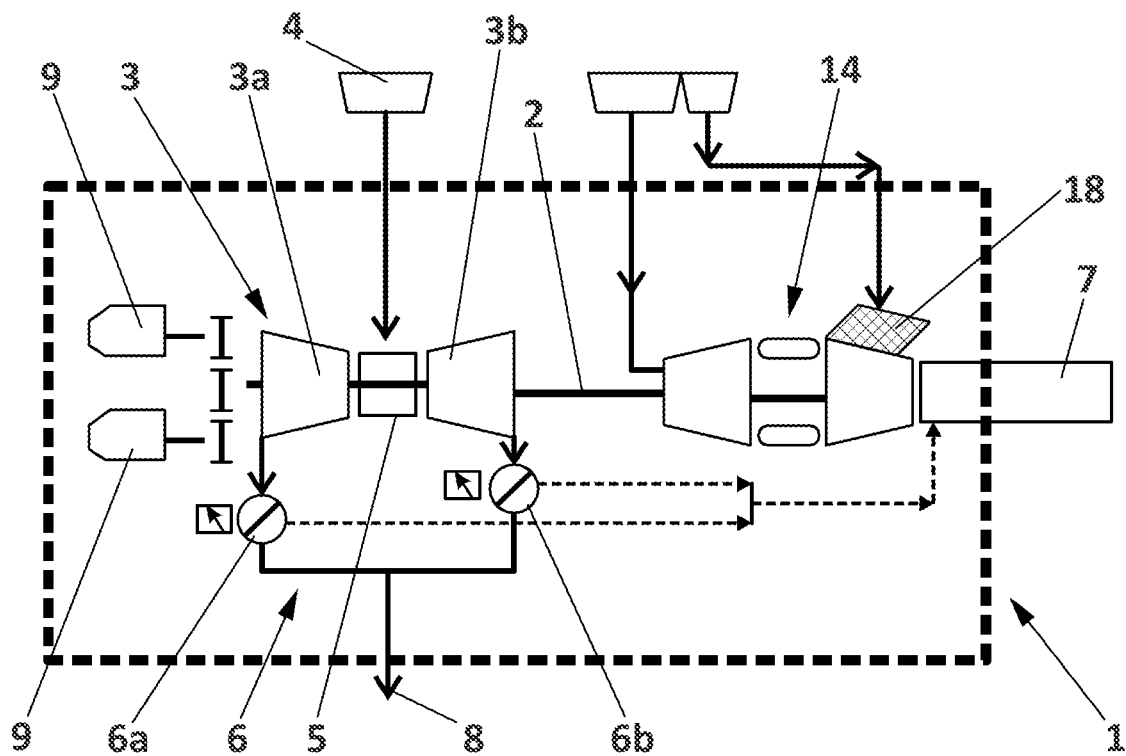
FIG. 1 is a schematic representation of a preferred example of a secondary power unit according to the invention.

FIG. 1 shows a preferred embodiment of a secondary power unit according to the invention, comprising a gas-turbine engine (14) having at least one drive shaft (2) and a twin-load compressor (3) including first and second load compressors (3a,3b) both mechanically coupled with the drive shaft (2) to provide respectively two flows of compressed air. Preferably, the engine has only one drive shaft, but an engine with two drive shafts could also be used.

Preferably, the first and second load compressors (3a,3b) are provided with air lubricated bearings, in order to prevent any oil contamination in the cabin. In order to achieve a higher block fuel reduction, one of the load compressors is sized for ground operation. Usually the corrected flow needed for ground operation represents half of the total corrected flow in flight, based on that fact the preferred solution is to choose a twin load compressor configuration, face to face arranged and fed by a single air inlet, it means two identical compressors, at least as close as possible, reducing the number of pieces to design and manufacture. In case the ground to flight ratio differs, two different compressor sizings would be chosen. A first ram-air intake (4) is in fluid communication with the twin-load compressor (3) to feed ram air to the first and second load compressors (3a,3b), in particular the ram-air intake (4) is connected with a plenum (5) which reduce speed and distribute ram air to both compressors (3a,3b). Flow regulating means (6) are coupled with the first and second compressors outputs to individually regulate the two flows of generated compressed air. More specifically, these flow regulating means (6) comprise a first three-way valve (6a) having one input connected with first compressor output, and a second three-way valve (6b) having one input connected with the second compressor output.

These three-way valves (6a,6b) can be used to avoid reverse flow, so that when both compressors are working they provide the same pressure so that none of them go on surge. When only one of the compressors is working to provide air flow to the aircraft, the non-operative compressor is isolated by closing its associated three-way valve, and when the two compressors are stopped, they are isolated by closing the three-way valves.

The flow regulating means (6) also comprises inlet guide vanes (IGV's) (not shown) for each compressor, to regulate individually air flow through the compressors.

One output of the first and second three-way valves (6a,6b) are connected with the exhaust output (7) to evacuate excess of air to the exterior, and another output of the second three-way valves (6a,6b) are connected to a general output (8) which is adapted to be communicated with an Air Cycle Machine (ACM) (17) of an aircraft. The secondary power unit (1) additionally comprises at least one electric generator (9), operatively coupled with the drive shaft (2) and adapted to provide electric power to an aircraft. Optionally, a hydraulic pump could also be coupled with the drive shaft (2).

A control system (not shown) is adapted to control the operation of the first and second load compressors (3a,3b) and the first and second three-way valves, in such a way to feed a flow of compressed air provided by the twin-compressor, as bleed air to an Air Cycle Machine (ACM) of an aircraft during an entire operation cycle.

Figure 2:
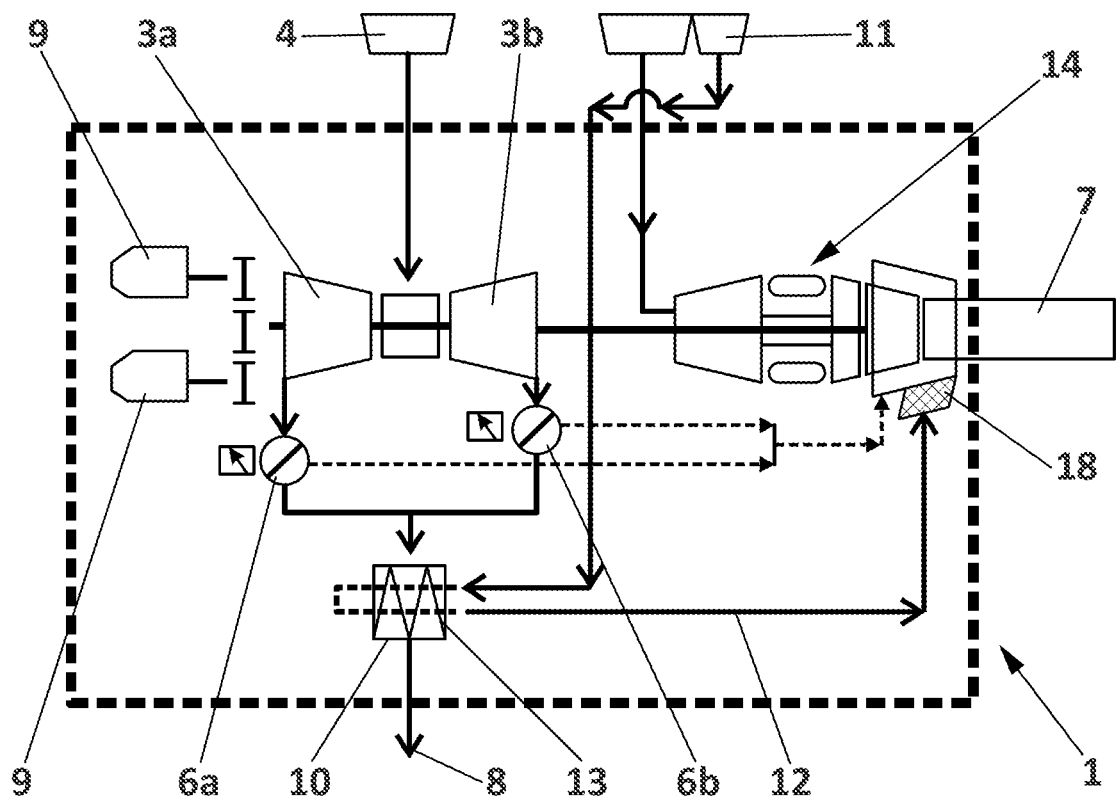
FIG. 2 is a schematic representation of another preferred example of a secondary power unit according to the invention.

In the embodiment of FIG. 2, a heat exchanger (10) is operatively installed at the general output (8), and a second ram-air intake (11) is provided, so that outside air is used to cool the flow of compressed air provided by the twin-compressor (3). The embodiment of FIG. 2 is preferred when there is the need to additionally cool down the compressed air.

A primary circuit (12) of the heat exchanger (10) is connected between the second ram-air intake (11) and the exhaust output (7) through an air-cooling heat exchanger (18) used to cool down oil temperature of the engine (14). A secondary circuit (13) of the heat exchanger (10) is connected between the outputs of the two three-way valves (6a,6b) and a compressed air output (8). With this arrangement the compressed air flowing through the secondary circuit (13) of the heat exchanger (10), is cooled by ram air flowing through the primary circuit (12).

In FIG. 2 the heat exchanger (10) and the air-cooling heat exchanger (18), are separated from each other, however in another preferred embodiment they could be assembled together.

Figure 3:
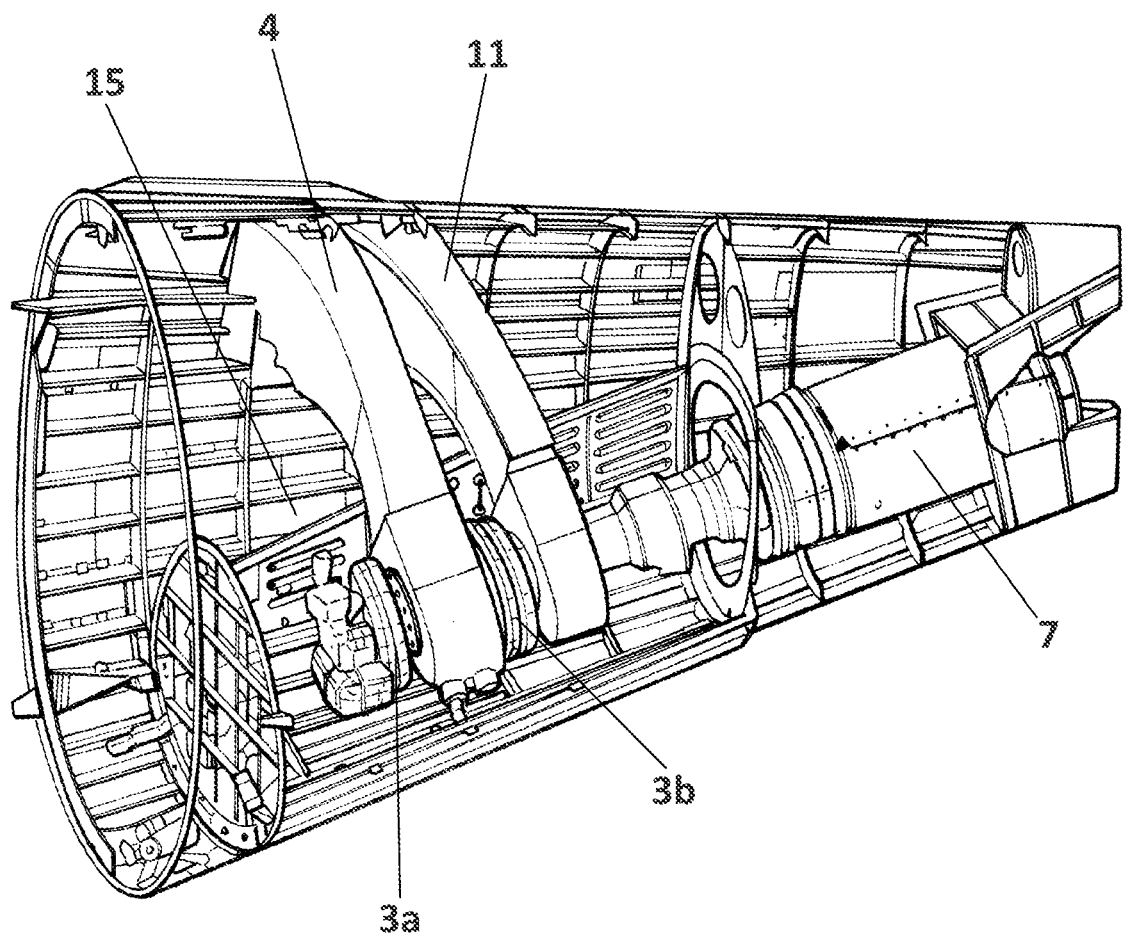
FIG. 3 is a perspective view of a rear section of an aircraft, including a secondary power unit housed within a fire compartment at this rear section.

As shown in FIG. 3, a secondary power unit (1) according to the invention is installed at the same location that a conventional APU, that is, housed within a fire compartment (15) at a rear section (16) of the aircraft. It should be noted that the architecture and design of the aircraft rear section no need to be modified significantly with respect to a usual APU installation. Components like: fire compartment, intake muffler, electric generators and so on, are substantially the same as conventional designs.

Figure 4:
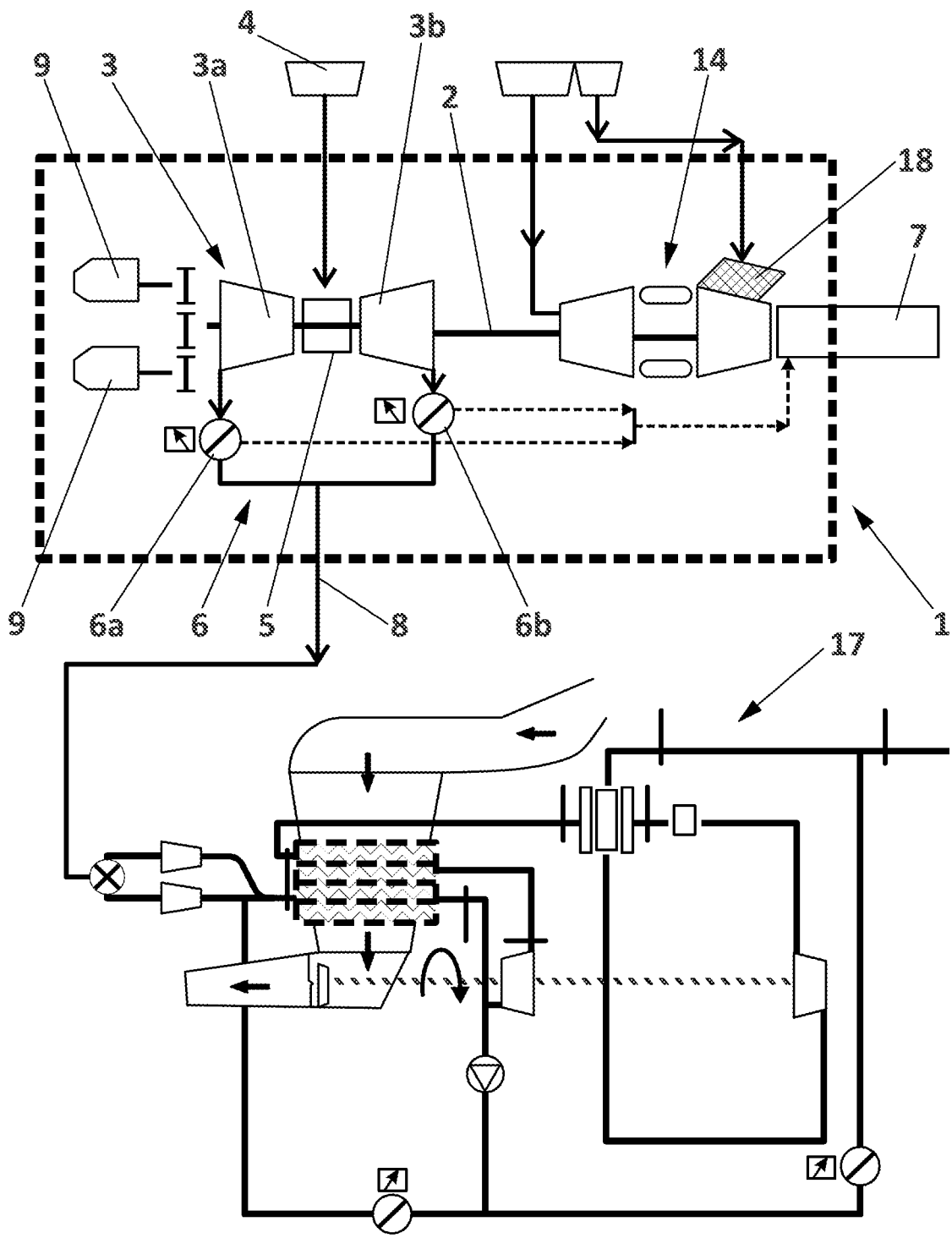
FIG. 4 is a schematic representation of a secondary power unit according to the invention in fluid communication with an Air Cycle Machine (ACM) of an aircraft.

As shown in FIG. 4, a secondary power unit (1) according to the invention, is in fluid communication with the Air Cycle Machine (ACM) (17) of an aircraft, in order to supply bleed air, the (ACM) (17).

The control system is adapted (programmed) to operate in three different modes:

Mode 1—aircraft is parked on ground.

For this mode, the control system is adapted such as one load compressor is supplying air to the ACM and the other load compressor is not supplying air, and preferably at least one electric generator is working, such as the majority of the bleed air and electric power required by the aircraft, is provided by the secondary power unit. One three-way valve is open and the other one is closed. This mode is similar to the conventional use of an APU.

Mode 2—aircraft taxing, climbing or descending below 25,000 ft.

For this mode, the control system is adapted such both first and second load compressors are running, as to provide bleed air at high pressure (around 40 psia) so that the condensers can be used. The electric generators could be stopped. Both three-way valves are open at the same position. The wings anti-ice system could be powered or supplied either by the secondary power unit or the main engines, and the ACM is running by the SPU. In case no need of drying the air or de-humidifying it the mode 2 could be avoided and pass to the mode 3.

Mode 3—aircraft in cruise, climbing or descending above 25,000 ft.

For this mode, the control system is adapted such as first and second compressors are running as to provide bleed air at low pressure (around 12 psia @ ceiling), slightly above the cabin need. The heat exchanger is used to cool down the air according to the mixer needs. Both the ACM's and the electric generators are stopped.

Part of the compressed air goes through the primary heat exchanger and later on by-passed through by-pass valve.

The control system may be implemented in many different ways known to a skilled person in the art. Conventionally the control system would comprise one or more programmable electronic devices, multiple sensors and actuators etc. The adaptation of the control system basically comprises suitable software stored and executed by the programmable electronic devices.

Figure 5:
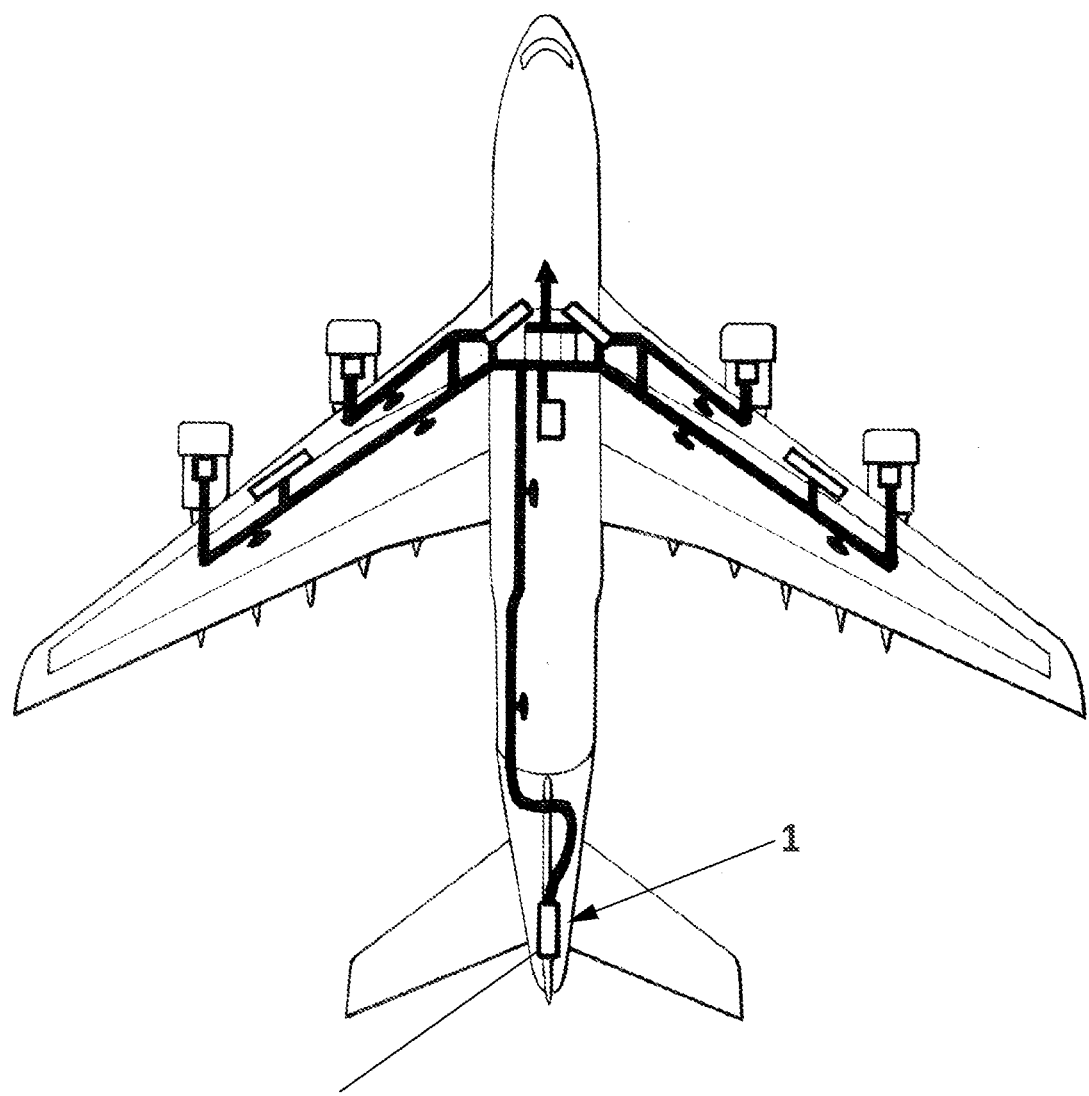
FIG. 5 is a top plan view of an aircraft showing the location of the secondary power unit, and its connection with the bleed air installation of an aircraft.

It can be noted in FIG. 5 the location of the secondary power unit (1) of the invention installed at the tail cone (16) of an aircraft, and its communication with the bleed system of the aircraft.

The air-conditioning generations units (AGU's) are usually installed at an unpressurized bay in the belly of the aircraft.

It has been determined that the invention is capable of reducing the energy supply up to 50%, depending on the flight phase, in some cases even more, to provide suitable temperature and pressure to an aircraft cabin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A secondary power unit for an aircraft adapted for supplying bleed air for an aircraft cabin, the secondary power unit comprising:
a gas-turbine engine having at least one drive shaft,
a twin-load compressor including first and second load compressors, both mechanically coupled with the drive shaft to provide a flow of compressed air,
a first ram-air intake in fluid communication with the twin-load compressor to feed ram air to the first and second load compressors,
flow regulating means coupled with outputs of the first compressor and the second compressor to individually regulate the generated flow of compressed air,
wherein the flow regulating means comprise a first three-way valve and a second three-way valve that are in fluid communication with an exhaust output to evacuate surge air to the exterior, and
wherein the flow regulating means are additionally adapted to be fluidly communicated with an Air Cycle Machine of the aircraft,
a control system adapted to control operation of the first and second load compressors and the flow regulating means, and
wherein the control system is configured to feed the flow of compressed air as bleed air to the Air Cycle Machine of an aircraft, both when the aircraft is on ground and in flight.

2. The secondary power unit for an aircraft according to claim 1 wherein the first and second three-way valves are in fluid communication with the exhaust output, and are adapted to be communicated with an Air Cycle Machine of the aircraft.

3. The secondary power unit for an aircraft according to claim 1, further comprising a heat exchanger and a second ram-air intake, wherein a primary circuit of the heat exchanger is connected between the second ram-air intake and the exhaust output, and a secondary circuit of the heat exchanger is connected between the first and second three-way valves and a compressed air output adapted to the be communicated with an Air Cycle Machine, such that the compressed air flowing through the secondary circuit can be cooled by ram air flowing through the primary circuit.

4. The secondary power unit for an aircraft according to claim 1, further comprising at least one electric generator operatively coupled with the drive shaft and adapted to provide electric power to the aircraft.

5. The secondary power unit for an aircraft according to claim 1, wherein the first and second load compressors are provided with air lubricated bearings.

6. The secondary power unit for an aircraft according to claim 1, wherein the control system is configured, such as when the aircraft is parked, one of the first and second load compressors is supplying air to the Air Cycle Machine and another of the first and second load compressors is not supplying air, and at least one electric generator is working, such that a majority of the bleed air and electric power required by the aircraft, is provided by the secondary power unit.

7. The secondary power unit for an aircraft according to claim 1, wherein the control system is additionally configured, such that when the aircraft is taxing, climbing or descending below a predefined height, the first and second load compressors are running, as to provide bleed air at high pressure around a first predefined pressure.

8. The secondary power unit for an aircraft according to claim 1, wherein the control system is additionally configured, such that when the aircraft is cruising, climbing or descending above a predefined height, the first and second compressors are running so as to provide bleed air at low pressure around a second predefined pressure, heat exchanger to cool down, air bypassed through temperature control valves and electric generator stopped, and wherein the Air Cycle Machine is non-operative.

9. An aircraft air-conditioning system comprising an Air Cycle Machine and a secondary power unit according to claim 1 in fluid communication with the Air Cycle Machine.

10. An aircraft comprising the air-conditioning system according to claim 9, wherein the secondary power unit is housed within a fire compartment at a rear section of the aircraft.

11. An aircraft comprising the air-conditioning system according to claim 9, wherein the control system is additionally configured, such that when the aircraft is taxing, climbing or descending below a predefined height, the first and second load compressors are running, as to provide bleed air at high pressure around a first predefined pressure, wherein the predefined height is about 25,000 ft.

12. An aircraft comprising the air-conditioning system according to claim 9, wherein the control system is additionally configured, such that when the aircraft is cruising, climbing or descending above a predefined height, the first and second compressors are running so as to provide bleed air at low pressure around a second predefined pressure, heat exchanger to cool down, air bypassed through temperature control valves and electric generator stopped, and wherein the Air Cycle Machine is non-operative, wherein the predefined height is about 25,000 ft.

13. An aircraft comprising the air-conditioning system according to claim 9, wherein the control system is additionally configured, such that when the aircraft is taxing, climbing or descending below a predefined height, the first and second load compressors are running, as to provide bleed air at high pressure around a first predefined pressure, wherein the first predefined pressure is about 40 psia.

14. An aircraft comprising the air-conditioning system according to claim 9, wherein the control system is additionally configured, such that when the aircraft is cruising, climbing or descending above a predefined height, the first and second compressors are running so as to provide bleed air at low pressure around a second predefined pressure, heat exchanger to cool down, air bypassed through temperature control valves and electric generator stopped, and wherein the Air Cycle Machine is non-operative, wherein the second predefined pressure is about 12 psia.

15. An aircraft comprising the air-conditioning system according to claim 9, wherein the flow regulating means also comprises inlet guide vanes for each compressor, to regulate individually air flow through the compressors.

\* \* \* \* \*